US011763373B2

(12) United States Patent
Zerfos et al.

(10) Patent No.: US 11,763,373 B2
(45) Date of Patent: Sep. 19, 2023

(54) METHOD, SYSTEM, AND MEDIUM FOR USER GUIDANCE AND CONDITION DETECTION IN A SHOPPING ENVIRONMENT

(71) Applicant: International Business Machines Corporation, Armonk, NY (US)

(72) Inventors: Petros Zerfos, New York, NY (US); Syed Yousaf Shah, Yorktown Heights, NY (US); Clifford A Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/417,371

(22) Filed: May 20, 2019

(65) Prior Publication Data

US 2020/0372567 A1    Nov. 26, 2020

(51) Int. Cl.
  *G06Q 30/0601*  (2023.01)
  *B62B 5/00*     (2006.01)
  *G06F 40/56*    (2020.01)

(52) U.S. Cl.
  CPC ....... *G06Q 30/0639* (2013.01); *B62B 5/0096* (2013.01); *G06Q 30/0641* (2013.01); *G06F 40/56* (2020.01)

(58) Field of Classification Search
  CPC ........... G06Q 30/0639; G06Q 30/0641; G06Q 30/0601–0645; H04W 4/024; G06F 40/56; B62B 5/0096; G01C 21/206
  USPC ...................................... 705/26.9, 26.1–27.2
  See application file for complete search history.

(56) References Cited

U.S. PATENT DOCUMENTS

| 4,096,920 A | 6/1978 | Heyn |
| 4,973,952 A | 11/1990 | Malac et al. |
| 6,000,610 A | 12/1999 | Talbott. et al. |
| 8,898,140 B2 | 11/2014 | Cooper et al. |
| 10,071,893 B2 | 11/2018 | High et al. |
| 2004/0148170 A1 | 7/2004 | Acero et al. |

(Continued)

FOREIGN PATENT DOCUMENTS

| CN | 105654668 | 8/2016 |
| DE | 10020544 A1 | 10/2001 |
| WO | 2017190938 A1 | 11/2017 |

OTHER PUBLICATIONS

Katina Michael, Mobile Alerts for People who Wander: Where RFID/NFC, Biometrics and GPS meet, Apr. 9, 2018 (Year: 2018).*

*Primary Examiner* — Allison G Wood
*Assistant Examiner* — Anna Mae Mitros
(74) *Attorney, Agent, or Firm* — Patterson + Sheridan, LLP

(57) ABSTRACT

An assistive shopping cart system for guiding a user and monitoring the user's physical and cognitive conditions in a shopping environment is described. The assistive shopping cart system provides assistance and guidance to a user based on a user profile. The assistive shopping cart system routes the user through the shopping environment using a shopping route generated based on the user profile. The assistive shopping cart system also detects and tracks user physical and cognitive conditions and user actions in the shopping environment. The user actions are used to aid in the completion of a purchase/transaction and generate shopping notifications for the user and others to understand the process of the shopping experience.

20 Claims, 11 Drawing Sheets

(56) References Cited

U.S. PATENT DOCUMENTS

| | | | |
|---|---|---|---|
| 2006/0087474 A1* | 4/2006 | Do | G01S 1/7034 |
| | | | 342/386 |
| 2008/0243626 A1 | 2/2008 | Stawar et al. | |
| 2012/0239504 A1 | 9/2012 | Curlander et al. | |
| 2014/0172640 A1* | 6/2014 | Argue | G06Q 30/0641 |
| | | | 705/26.61 |
| 2015/0039462 A1* | 2/2015 | Shastry | G06Q 30/0631 |
| | | | 705/26.81 |
| 2015/0042469 A1 | 2/2015 | Baldocchi et al. | |
| 2016/0342905 A1* | 11/2016 | Ghose | G06Q 50/01 |
| 2017/0337602 A1* | 11/2017 | Davis | G06V 40/174 |

* cited by examiner

METHOD, SYSTEM, AND MEDIUM FOR USER GUIDANCE AND CONDITION DETECTION IN A SHOPPING ENVIRONMENT

BACKGROUND

The present disclosure relates to providing assistance to a user in a shopping environment, and more specifically, to an assistive shopping cart system which provides routing and other assistance to a user.

Increasingly, those who may have been homebound due to physical and mental limitations are able to live more independent lives, including everyday tasks such as shopping. While these individuals have increasing independence, some environments, such as supermarkets/grocery stores can still present challenges in navigating through the environment, requirements for physical assistance to traverse the environment, and monitoring of an individual's physical and cognitive conditions while in the environment.

SUMMARY

In some embodiments described herein, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method including: receiving a user profile and a shopping list for a user at an assistive shopping cart system in a shopping environment; generating, based on the user profile, the shopping list, and a shopping environment layout, a shopping route through the shopping environment for the assistive shopping cart system; guiding, via a navigation module of the assistive shopping cart system, the assistive shopping cart system through the shopping environment along the generated shopping route; detecting one or more user actions in the shopping environment; detecting user cognitive and physical conditions based on the user actions and the user profile; sending one or more shopping notifications based on the one or more user actions and the user cognitive and physical conditions to a shopping supervisor; and updating the user profile based on the one or more user actions and the user cognitive and physical conditions. Other embodiments of this aspect include corresponding computer systems, apparatus, and computer programs recorded on one or more computer storage devices, each configured to perform the actions of the methods.

One embodiment described herein includes a system, the system including: one or more computer processors; and a memory containing a program which when executed by the computer processors performs an operation. The operation includes: receiving a user profile and a shopping list for a user at an assistive shopping cart system in a shopping environment; generating, based on the user profile, the shopping list, and a shopping environment layout, a shopping route through the shopping environment for the assistive shopping cart system; guiding, via a navigation module of the assistive shopping cart system, the assistive shopping cart system through the shopping environment along the generated shopping route; detecting one or more user actions in the shopping environment; detecting user cognitive and physical conditions based on the user actions and the user profile; sending one or more shopping notifications based on the one or more user actions and the user cognitive and physical conditions to a shopping supervisor; and updating the user profile based on the one or more user actions and the user cognitive and physical conditions.

Another embodiment described herein includes a computer program product, the computer program product including: a computer-readable storage medium having computer-readable program code embodied therewith, the computer-readable program code executable by one or more computer processors to perform an operation. The operation includes: receiving a user profile and a shopping list for a user at an assistive shopping cart system in a shopping environment; generating, based on the user profile, the shopping list, and a shopping environment layout, a shopping route through the shopping environment for the assistive shopping cart system; guiding, via a navigation module of the assistive shopping cart system, the assistive shopping cart system through the shopping environment along the generated shopping route; detecting one or more user actions in the shopping environment; detecting user cognitive and physical conditions based on the user actions and the user profile; sending one or more shopping notifications based on the one or more user actions and the user cognitive and physical conditions to a shopping supervisor; and updating the user profile based on the one or more user actions and the user cognitive and physical conditions.

DETAILED DESCRIPTION

As assistive technology progresses, people who were previously homebound or not able to move about a community without significant assistance are now able to live more independently. Ubiquitous intelligent devices such as smart phones and network-connected/Internet-of-Things (IoT) devices allow for people to venture out of their homes without worry of getting lost or experiencing a medical emergency without access to aid. Furthermore, intelligent devices also aid those who may not need assistance to optimize/streamline their everyday life. For example, people use navigation and time management applications on their smart devices to avoid delays and wasted time during the normal course of their day.

A common task that most everyone frequently participates in is shopping, and more specifically, grocery shopping. In the past, as a person faces cognitive or physical decline, everyday tasks such as grocery shopping become more difficult. With the increasing independence described above, a person may be able to arrive at a grocery store, but still face problems while attempting to shop, such as trouble locating items and overexertion while traversing the store. Additionally, those able to shop without needing assistance may still desire relevant information concerning the location of items within the store and how to best navigate a shopping environment.

The assistive shopping cart system and methods described herein include a physical assistive shopping cart system, which assists a user by traversing/aiding a user in a shopping environment.

Figure 1:
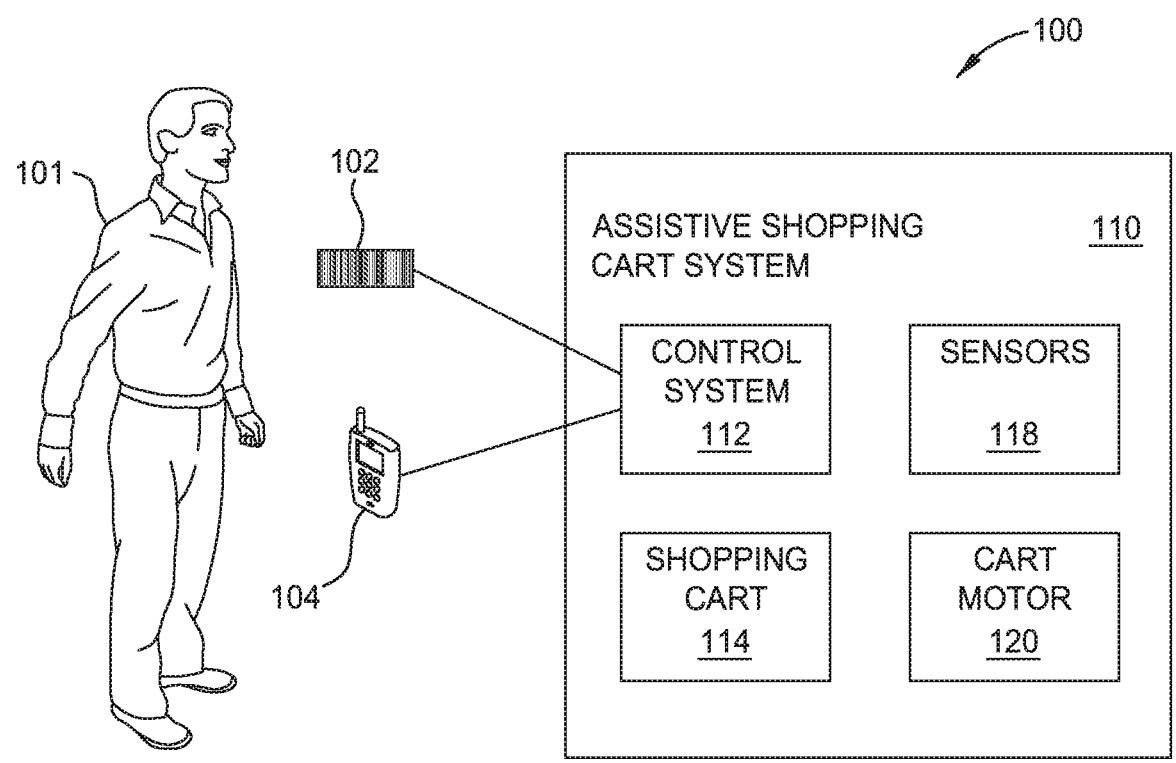
FIG. 1 illustrates an example assistive shopping cart system and shopping environment, according to one embodiment.

FIG. 1 illustrates an example assistive shopping cart system and shopping environment, according to one embodiment. As shown, the shopping environment, environment 100 includes a user 101. The user 101 may include a customer of the shopping environment, and/or any other person or entity in a shopping environment. As described herein, the environment 100 may include a grocery store where the user 101 can traverse the environment 100 to browse and acquire items for purchase. While described herein in relation to a grocery shopping environment, the shopping environment can include any other type of retail and/or public environment such as a superstore, department store, hardware store, etc.

The environment 100 includes the assistive shopping cart system 110. In some examples, the assistive shopping cart system 110 includes a shopping cart 114, which includes a receptacle to place items for purchase. The assistive shopping cart system 110 also includes a control system 112. In some examples, the control system 112 is configured to control/guide the assistive shopping cart system 110 as it traverses the environment 100 including a cart motor 120 which provides propulsion to the shopping cart 114. The assistive shopping cart system 110 may be configured as a self-propelled shopping cart with a platform accommodation for transporting a passenger behind the cart.

Figure 4:
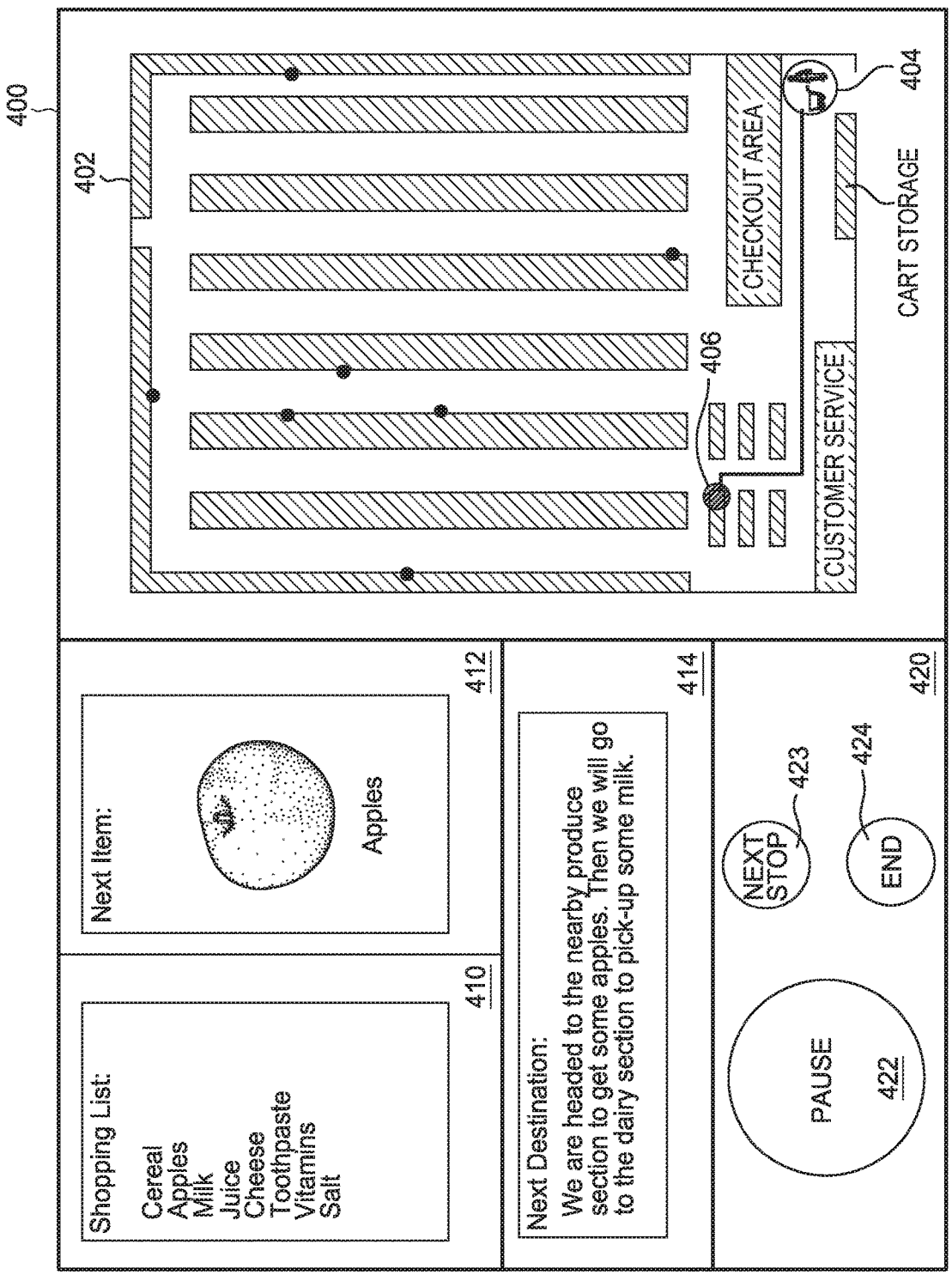
FIG. 4 illustrates an example user interface for an assistive shopping cart system, according to one embodiment.
Figure 9:
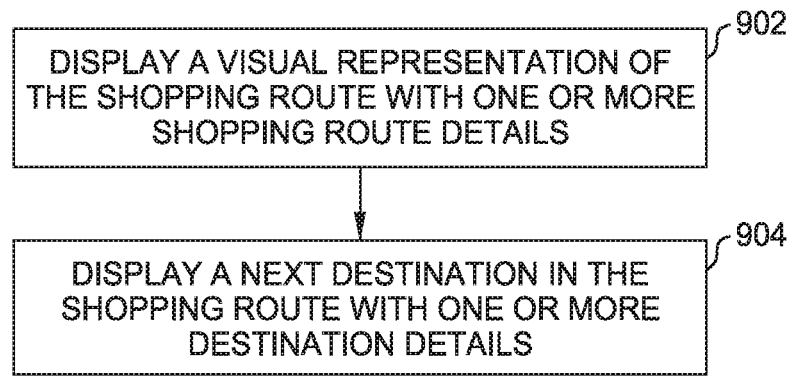
FIG. 9 illustrates a flowchart for visually guiding a user through a shopping environment, according to embodiments

In some examples, the control system 112 includes a user interface, including audio, visual, and tactile input/outputs, that provides for interactions between the user 101 and the assistive shopping cart system 110, as described in relation to FIG. 4 and FIG. 9. In some examples, the user interface allows user 101 to verbally interact with the assistive shopping cart system 110 using a microphone on/associated with the cart or on a smartphone, such as the mobile device 104. The cart may also be equipped to be controlled via gestures such as hand gestures. The user interface allows for a user to interact with and understand actions taken by the assistive cart system 110. For example, as described herein, a user is provided one or more natural language descriptions of the shopping trip while traversing the shopping environment which helps the user understand where they are in the environment 100 and where the user 101 is headed next during the shopping trip.

As described in further detail herein, in some examples, the user may utilize a user identification card, card 102, and/or a user mobile device, mobile device 104 to identify themselves to the assistive shopping cart system 110. The control system 112 performs a lookup and/or receives a user profile for the user 101 using identifying information in the card 102 and/or mobile device 104. The control system 112 then generates user specific routes and route the user 101 through the environment 100. For example, control system 112 receives a user profile for a user at the assistive shopping cart, assistive shopping cart system 110, in the environment 100 and generates, based on the user profile and a shopping environment layout, as described in relation to FIG. 2, a shopping route through the shopping environment for the assistive shopping cart system 110. In some examples, the sensors 118 associated with the assistive shopping cart system 110 may also track items added to the receptacle of the shopping cart 114. In some examples, the control system 112 also monitors the physical conditions of the user 101 using the sensors 118 and other sensors located in the environment 100. For example, the sensors 118 may be used to detect anomalous user movements, such as stumbles, prolonged pauses, drifting gazes, along with biometric information such as pulse, breathing rates, etc.

Figure 2:
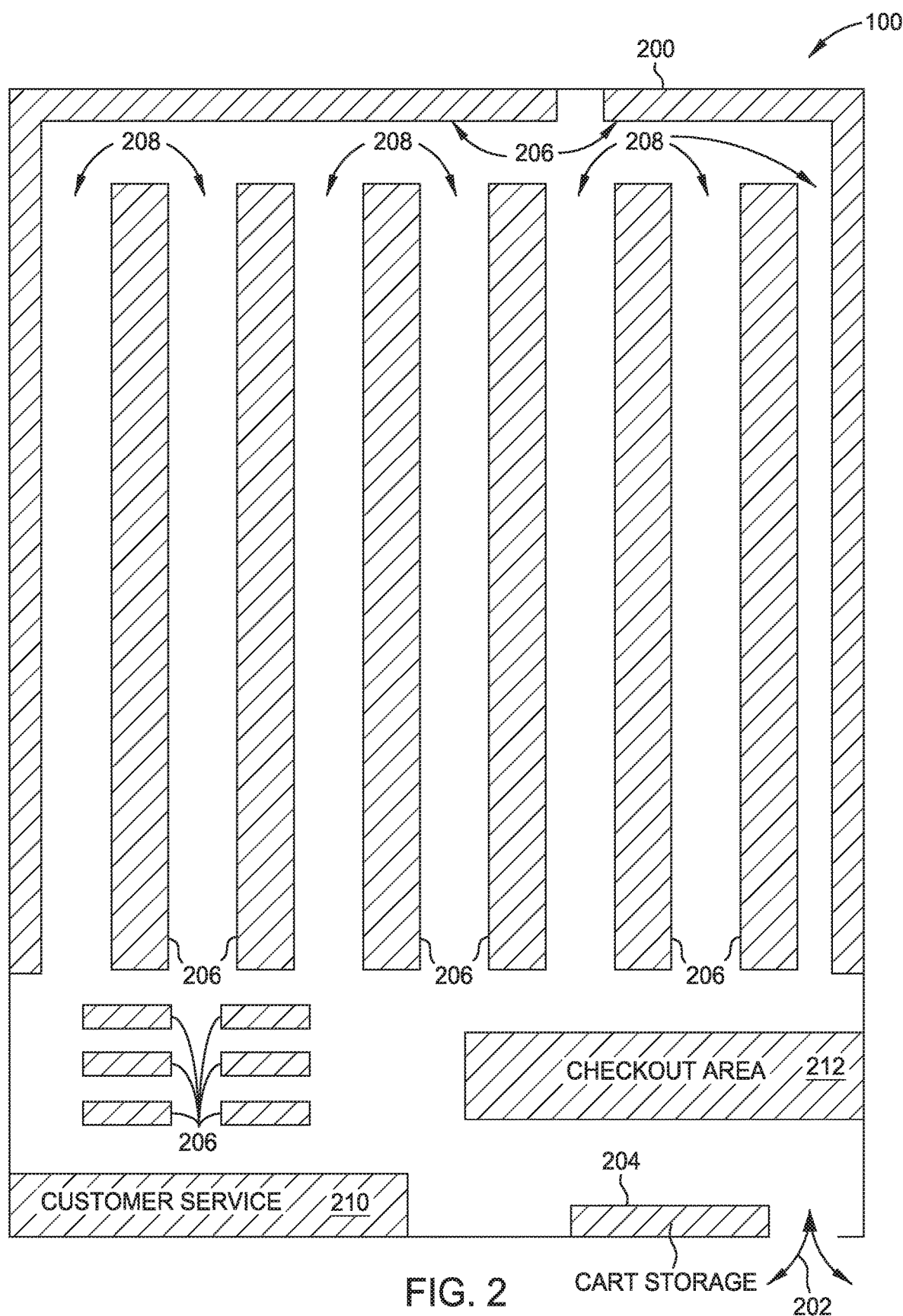
FIG. 2 illustrates an example shopping environment layout, according to one embodiment.

FIG. 2 illustrates an example shopping environment layout, according to one embodiment. For example, the environment 100 may include sections 206 where items for purchase are located. For example, the sections 206 may include shelves, endcaps, and other displays for products/items for purchase. Additionally, the environment 100 includes aisles 208 between the sections 206 where customers, employees, and others may travel between the aisles. For example, customers may navigate the aisles 208 and approach, view, handle, and select items in the sections 206. In some examples, a user may traverse or travel through the environment 100 with a shopping receptacle, e.g., the assistive shopping cart system 110 and select items for purchase by placing the items in the shopping receptacle. In addition to the assistive cart described herein, examples of shopping receptacles in the environment 100 may include shopping carts, baskets, or other containers that may be carried or otherwise transported by the user in the environment 100.

In some examples, the environment 100 includes one or more entrances and exits, such as entrance 202, an area for cart storage, e.g., cart storage area 204, and a customer service area 210 where a user can interact with an employee or customer service representative for the environment 100.

As described above, the control system 112 generates a shopping route through the shopping environment for the assistive shopping cart system using the user profile, received from the user 101, and the layout 200. Once the user's profile and destinations are determined, the control system 112 guides the user through the environment 100. The control system 112 routes, via a navigation module of the assistive shopping cart system 110, the shopping cart 114 through the environment 100 along the generated shopping route, as described in relation to FIGS. 3A-C.

Figure 3A:
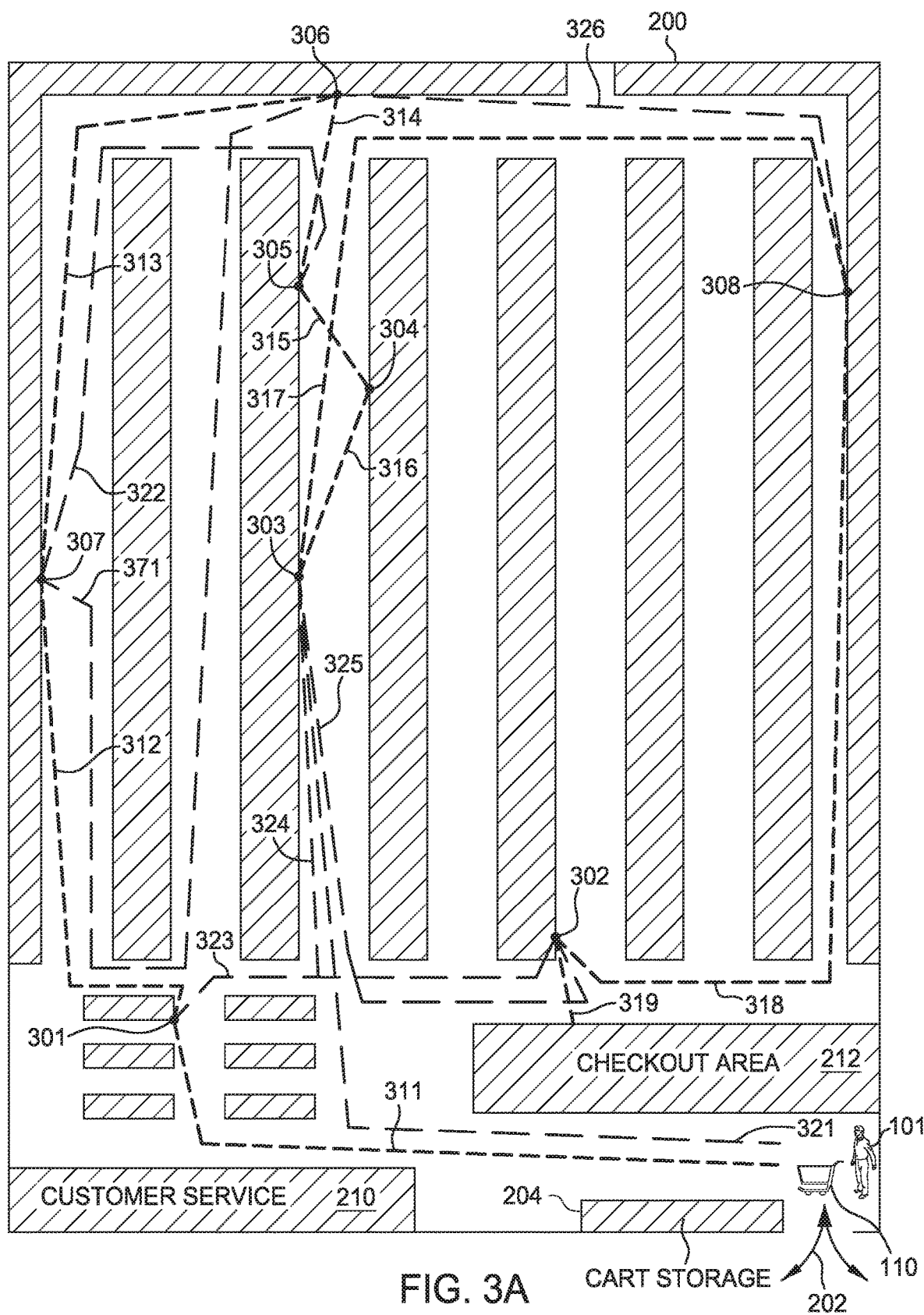
FIG. 3A illustrates example shopping route options in a shopping environment layout, according to one embodiment.

FIG. 3A illustrates example shopping route options in a shopping environment layout, according to one embodiment. In some examples, the control system 112 determines, from the user profile, one or more destinations in the shopping environment. For example, as shown in FIG. 3A, the control system 112 determines from the user profile and a shopping list, that there are multiple products on the user's shopping list that is associated with the user profile. In some examples, the shopping list is received as part of the user profile and/or as an independent list. In some examples, the shopping list includes items added by the user 101 and/or a person associated with the user (e.g., a caretaker). In some examples, the shopping list may include one or more items that are added by the control system 112 based on the user's shopping history. For example, if the user frequently purchases milk, the control system 112 adds milk to the shopping list and/or the one or more destinations. As shown in FIG. 3, using the layout 200 and the user profile, the control system 112 determines that the destinations 301, 302, 303, 304, 305, 306, 307, and 308 should be visited during the shopping trip/experience. In some examples, the destinations 301-308 are locations of items on the user shopping list. In some examples, one or more of the destinations 301-308 are locations in the environment 100 that the user may visit even if there is not a corresponding item to purchase.

The control system 112 determines route options between the destinations 301-308 for the user to travel. In some examples, the route options are based on various routing frameworks. For example, if a user, based on the user profile, is known to have trouble walking long distances the routing framework includes minimizing routing distances both between destinations and/or the total route during the shopping trips. The route options may also be generated based on grouping items that are close together in the environment 100 and, in some cases when appropriate, relatively close to the entrance 202. For example, the control system 112 minimizes the walking needed to get into the store to obtain items on a shopping list by considering groups of items (or their roughly equivalent substitutes) that are relatively close to the entrance 202 where the user 101 enters the store.

In another example, the user 101 may want to maximize movement during the shopping trip, such that the framework includes maximizing the routing distances and the total route. In some examples, the routing framework also includes prioritizing one or more destinations in the shopping environment and monitoring user conditions. For example, destinations associated with necessities on the shopping list, (e.g., medicine, milk, etc.) are priorities during the shopping trip. In an example where milk is at destination 306 and when the milk has a high prioritization associated with it in the user profile, the control system 112 will attempt to guarantee that the destination 306 is visited during the shopping trip by routing to the destination early in the shopping trip. The user monitoring conditions may also be used to determine/update route options between the destinations. For example, if the control system 112 determines that the user is beginning to fatigue, routes between destinations may be updated to prevent user over exertion and to route towards higher priority items/destinations. The control system 112 also generates the shopping route using the one or more routing frameworks and the one or more route options as shown in FIGS. 3B-C.

Figure 3B:
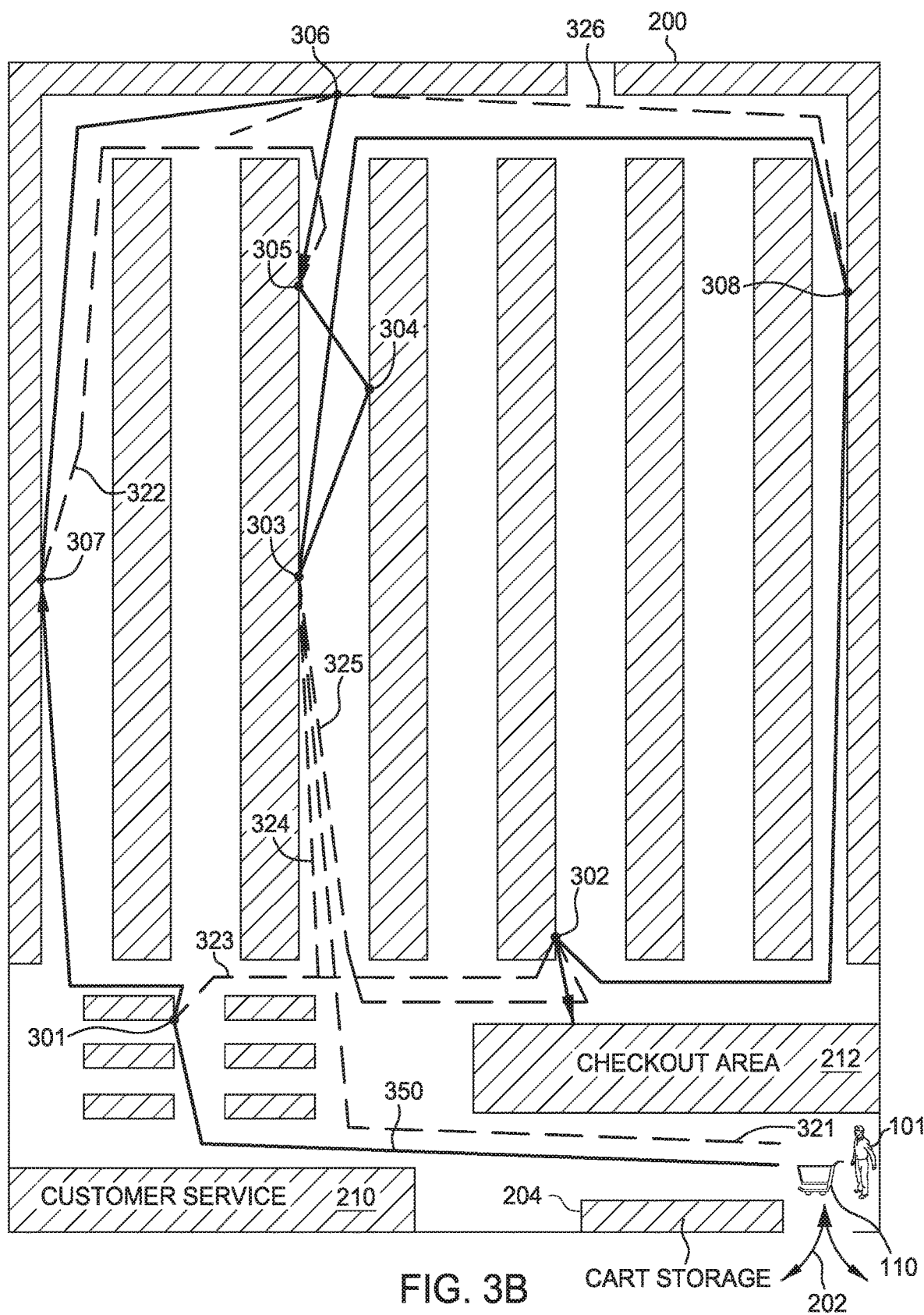
FIGS. 3B-C illustrate example shopping route options and example shopping routes in a shopping environment layout, according to various embodiments.
Figure 3C:
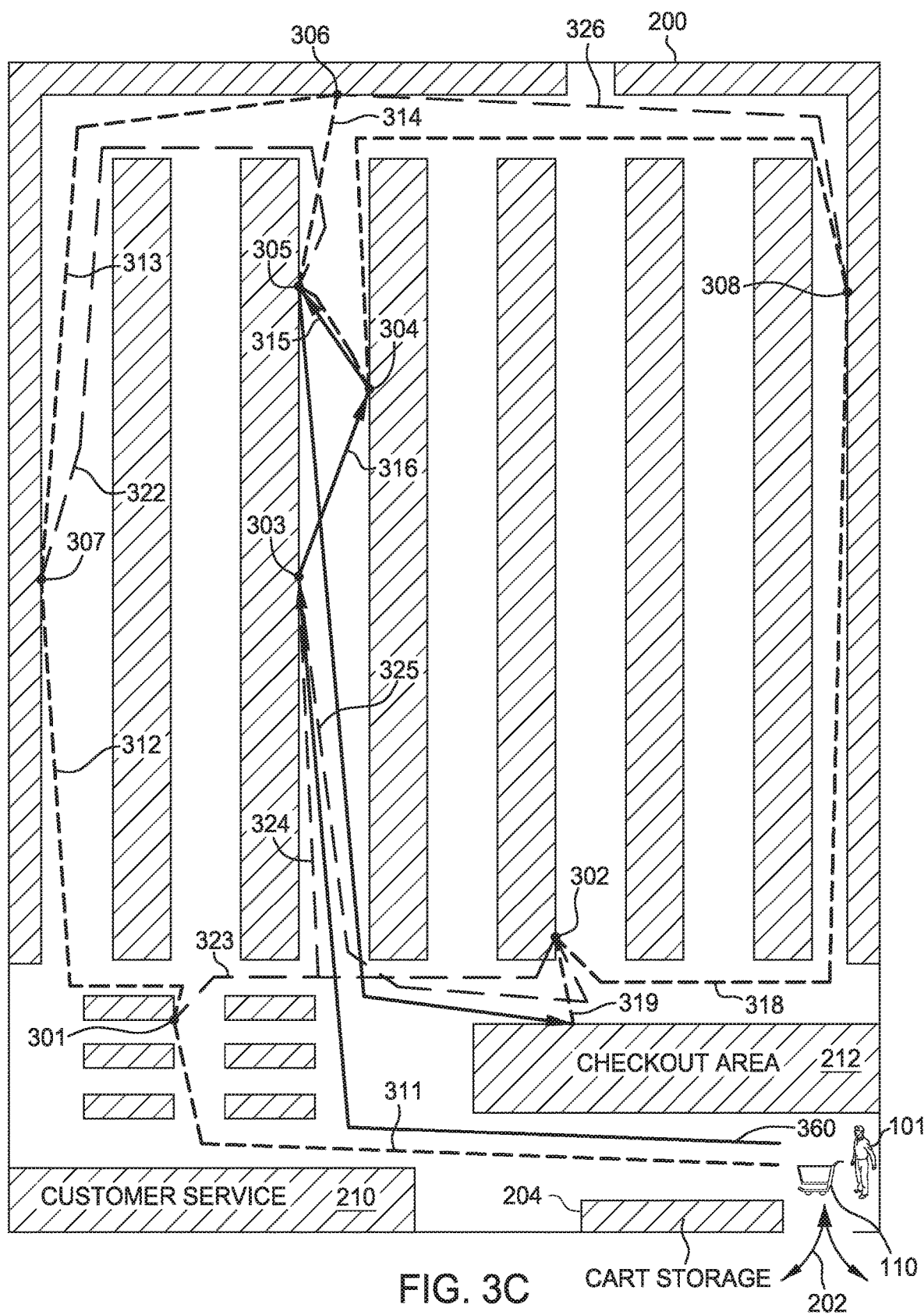

FIGS. 3B-C illustrate example shopping route options and example shopping routes in a shopping environment layout, according to various embodiments. When the user 101 enters the environment 100 through the entrance 202, the user retrieves an assistive shopping cart system 110 from a cart storage area 204. In another example, the user 101 may retrieve an assistive shopping cart system 110 from another area, such as a parking lot or other storage area. Once the control system 112 receives the user profile for the user 101 and generates the route options as discussed in relation to FIGS. 2 and 3A, the control system 112 generates the shopping route 350 shown in FIG. 3B. As shown, the shopping route 350 traverses the environment 100 and stops at every shopping destination 301-308. During the shopping trip the user 101 is routed by the assistive shopping cart system 110 through the environment 100 via the shopping route 350.

In another example, during the generation of the shopping route the assistive cart determines from the user profile and routing frameworks, that the user 101 should only traverse a limited sub-selection of shopping destinations during the shopping trip. This can be due to user fatigue, time limitations, mobility limitation, etc. As shown, the shopping route 360 traverses a limited number of shopping destinations (i.e., shopping destinations 303, 304, and 305) before routing towards a checkout area 212 and the entrance 202 for exiting the store. In some examples, the during the shopping trip and as the assistive cart system is routed along the shopping route (e.g., shopping route 350), the control system 112 receives one or more shopping route exceptions as discussed herein in relation to FIG. 7. The control system 112 then determines, using the one or more routing frameworks and based on the shopping route exception, one or more updated route options between the one or more destinations. For example, the after reaching destination 301 in shopping route 350, the control system 112 receives a shopping route exception as instead of proceeding along route option 312, redirects the shopping route to route option 323 to destination 302 and the checkout area 212 to shorten the shopping trip.

In some examples, in order to aid the user 101 in understanding the shopping trip and to know where the assistive shopping cart system 110 is being routed, the control system 112 displays various information through a user interface associated with the control system 112, as described in relation to FIG. 4.

FIG. 4 illustrates an example user interface for an assistive shopping cart system, according to one embodiment. The user interface 400 includes various information that is obtained and displayed by the control system 112. For example, the shopping list 410 includes items in the shopping list determined from the user profile. The user interface 400 also includes the next item 412, which can include both an identification of the item in the shopping list that is at the next destination "Apples" and/or a visual or pictorial representation of the item (e.g., an image of an apple(s)).

In order to further facilitate understanding of the shopping route and shopping trip to the user, the user interface 400 also includes the next destination 414, which includes an explanation of the next destination generated by the control system 112. For example, the next destination 414 may include an identification of a next destination or stop along with one or more future stops in the shopping route. In some examples, the control system 112 generates and displays and/or audibly broadcasts a natural language explanation of the next destination 414. In some examples the natural language explanation is generated based on one or more properties and/or conditions stored in the user profile. For example, for a user 101 that has cognitive decline as indicated in the user profile, the next destination may include details in addition to the destination including a time to the destination. In some examples, the next destination 414 includes details on the route choices including details on an indirect route (to avoid a crowded aisle, hazard, etc.). In some examples, the user 101 interacts with the cart system 110 to request an explanation of the next destination 414.

Similarly, the user interface 400 also includes the layout 402 where a user can view a layout of the store, layout 402, along with an avatar 404 representing their position within the environment 100. The shopping route including the next destination 406 is displayed to the user 101 so he or she can understand their position in the environment 100 along with the progress of his or her shopping trip.

The user interface 400 also includes a user interaction area 420 where a user can use input buttons 422, 423, and 424, to alter their shopping trip and route. For example, the user 101 can pause the shopping trip using input button 422 and/or end the shopping trip using input button 424. In some examples, the user interface 400 may include one or more sections responsive to trigger signals provided by transmitters/sensors associated with a particular location in the store or an item in the store. For example, an advertisement may be displayed to the user 101 on the user interface 400.

Figure 5:
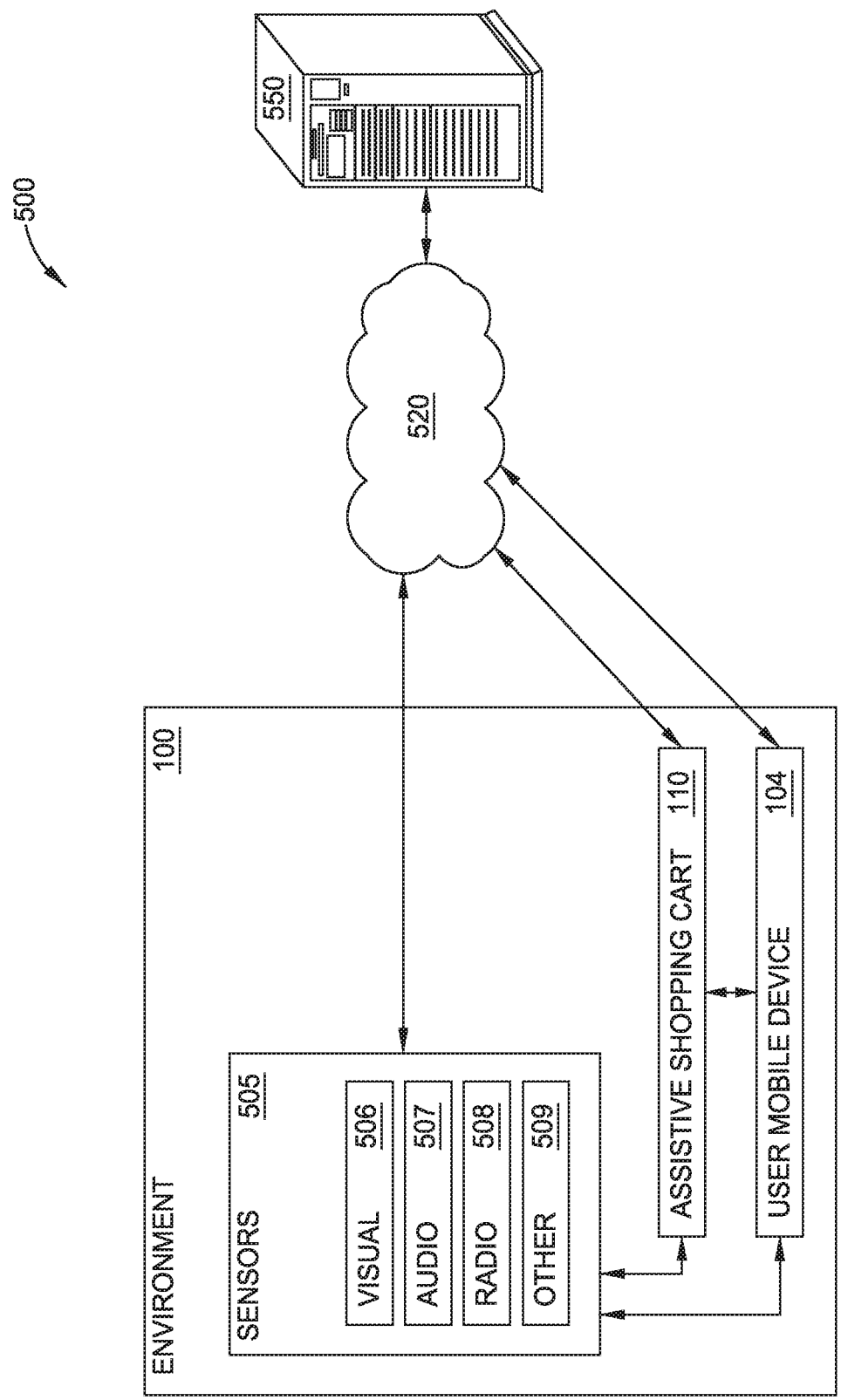
FIG. 5 illustrates a system to facilitate an assistive shopping cart, according to one embodiment.

FIG. 5 illustrates a system 500 to facilitate an assistive shopping cart, according to one embodiment. As illustrated and shown in FIG. 1, the system 500 may include various components within the environment 100, including the assistive shopping cart system 110. The system 500 may also include components that are outside the environment 100. For example, a server 550 may be located remotely from the environment 100, such as in a cloud computing system or a at a central control center for the shopping environment.

In some examples, components within the environment 100 include one or more sensors 505 for monitoring the environment 100 and users, such as the user 101, during a shopping trip. The sensors may include visual sensors 506, audio sensors 507, radio sensors 508, and other sensors 509. The sensors 505 may also include other sensors 407 capable of providing meaningful information about the shopping trip of the user including a location of the user in the environment 100 and the items a user has in a shopping receptacle such as the assistive shopping cart system 110. Sensors 505 may be in fixed locations such as included in the walls, floors, ceilings, and other structures of the environment 100 and may also be affixed to one or more shopping carts, such as assistive shopping cart system 110. Sensors 505 may also include sensor devices that are included in computing devices associated with the environment 100, such as mobile devices carried by employees and/or customers of the environment 100.

Server 550 generally includes processor(s), memory, and communications capabilities and is configured to perform various computing tasks to support the management and operation of the assistive shopping cart system 110 in the environment 100. Server 550 may communicate using various wired and/or wireless communications methods with sensors 505, the assistive shopping cart system 110, customer/user devices, such as mobile device 104, and with other networked devices. In some examples, the server 550 generally executes computer program code in which input data is received from the networked devices, the input data is processed and/or stored by the servers, and output data is provided to networked devices such as the assistive shopping cart system 110. For example, while the control system 112 is shown in FIG. 1 as associated with the assistive shopping cart system 110, some of the functions and modules and data of the control system 112 may be executed and/or stored on the server 550.

Figure 6:
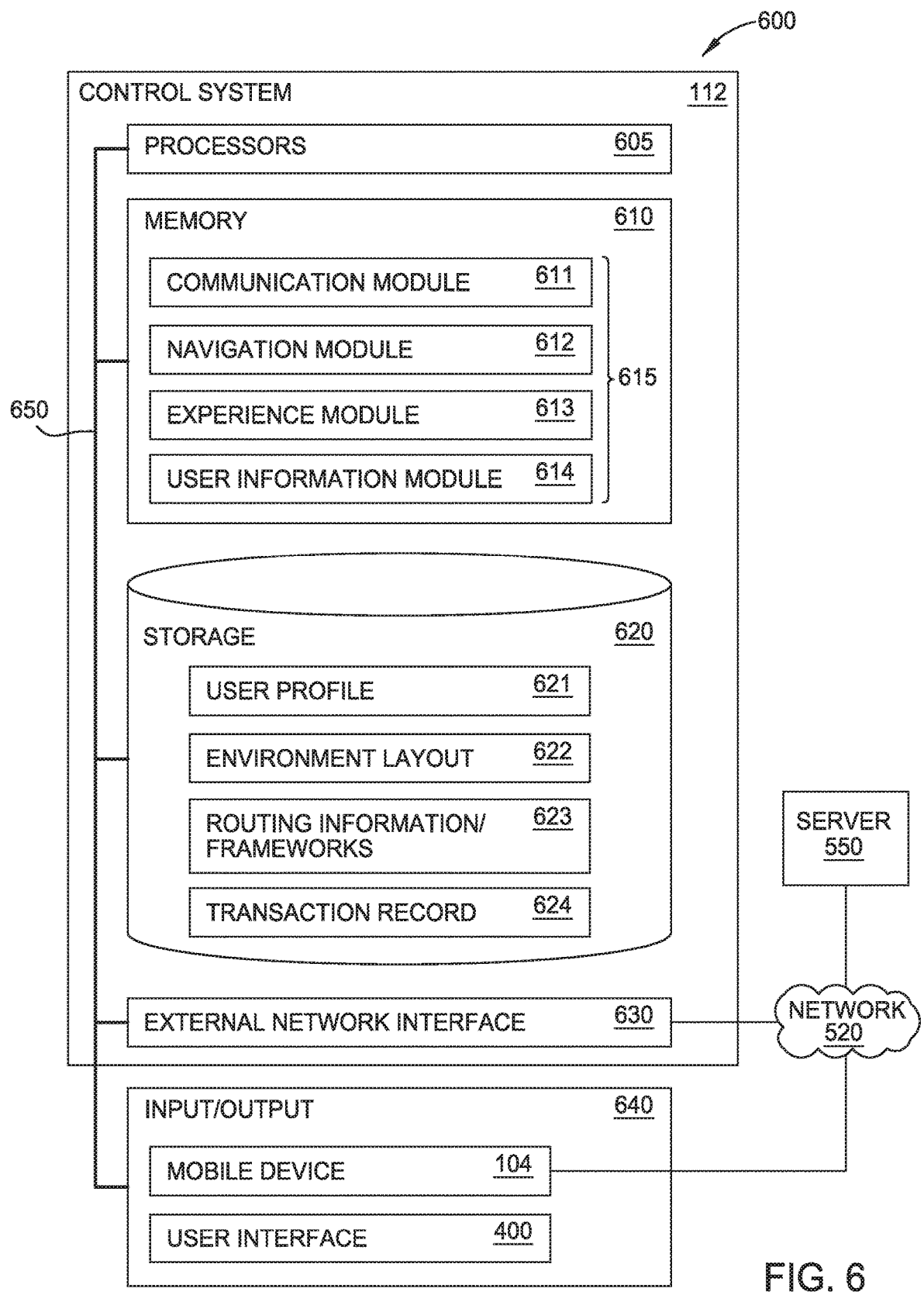
FIG. 6 illustrates a block diagram of an assistive shopping cart system, according to one embodiment

Network 520 may include one or more networks of various types, including a local area or local access network (LAN), a general wide area network (WAN), and/or a public network (e.g., the Internet). In one embodiment, various networked computing devices of the system 500 are interconnected using a LAN, and one or more computing devices (e.g., server 550, assistive shopping cart system 110, etc.) include connections to the Internet FIG. 6 is a block diagram of a control system for a control system for an assistive cart system, such as the assistive shopping cart system 110. In some examples, the control system 112 may be embodied on a computing device located on the assistive shopping cart system 110. In some examples, the control system 112 may be located on a computing device remote from the assistive shopping cart system 110, such as server 550, to facilitate the assistive cart system in the environment 100, according to one embodiment. As shown in FIG. 6, the arrangement 600 may include the control system 112 configured to execute the functions described herein. The control system 112 is shown in the form of a general-purpose computing device. The components of control system 112 may include, but are not limited to, one or more processing units or processors 605, a Memory 610, a storage system 620, network interface 630, and a bus 650 that couples various system components including the memory 610 and storage system 620 to processors 605 along with various input/output components 640. In other embodiments, arrangement 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Control system 112 typically includes a variety of computer system readable media. Such media may be any available media that is accessible by control system 112, and it includes both volatile and non-volatile media, removable and non-removable media.

Memory 610 can include computer system readable media in the form of volatile memory, such as random access memory (RAM) and/or cache memory. Control system 112 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. As will be further depicted and described below, memory 610 may include at least one program product having a set (e.g., at least one) of program modules that are configured to carry out the functions of embodiments of this disclosure.

Control system 112 may further include other removable/non-removable, volatile/non-volatile computer system storage media. In some examples, storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage system 620 may include media for storing user profile 621, environmental layouts 622, such as the layout 200, routing/information and frameworks 623, and transaction record 624 to track a user's transactions in the environment 100. The storage system 620 may be updated and accessed by the program modules 615 described herein.

Memory 610 may include a plurality of program modules 615 for performing various functions described herein. The program modules 615 generally include program code that is executable by one or more of the processors 605. As shown, program modules 615 include communication module 611, navigation module 612, experience module 613, and user information module 614.

Control system 112 may also communicate with one or more external devices providing an interface for a user, such as a keyboard, a pointing device, a display, etc.; and one or more devices that enable a user to such as interact with control system 112; and/or any devices (e.g., network card, modem, etc.) that enable control system 112 to communicate with one or more other computing devices. Such communication can occur via I/O components 640. Additionally, control system 112 may communicate with one or more networks such as a local area network (LAN), a general wide area network (WAN), and/or a public network (e.g., the Internet) via network interface 630. As depicted, network interface 630 communicates with the other components of control system 112 via bus 650. It should be understood that although not shown, other hardware and/or software components could be used in conjunction with control system 112. Examples, include, but are not limited to: cloud computing systems, microcode, device drivers, redundant processing units, external disk drive arrays, RAID systems, tape drives, and data archival storage systems, etc.

Figure 7:
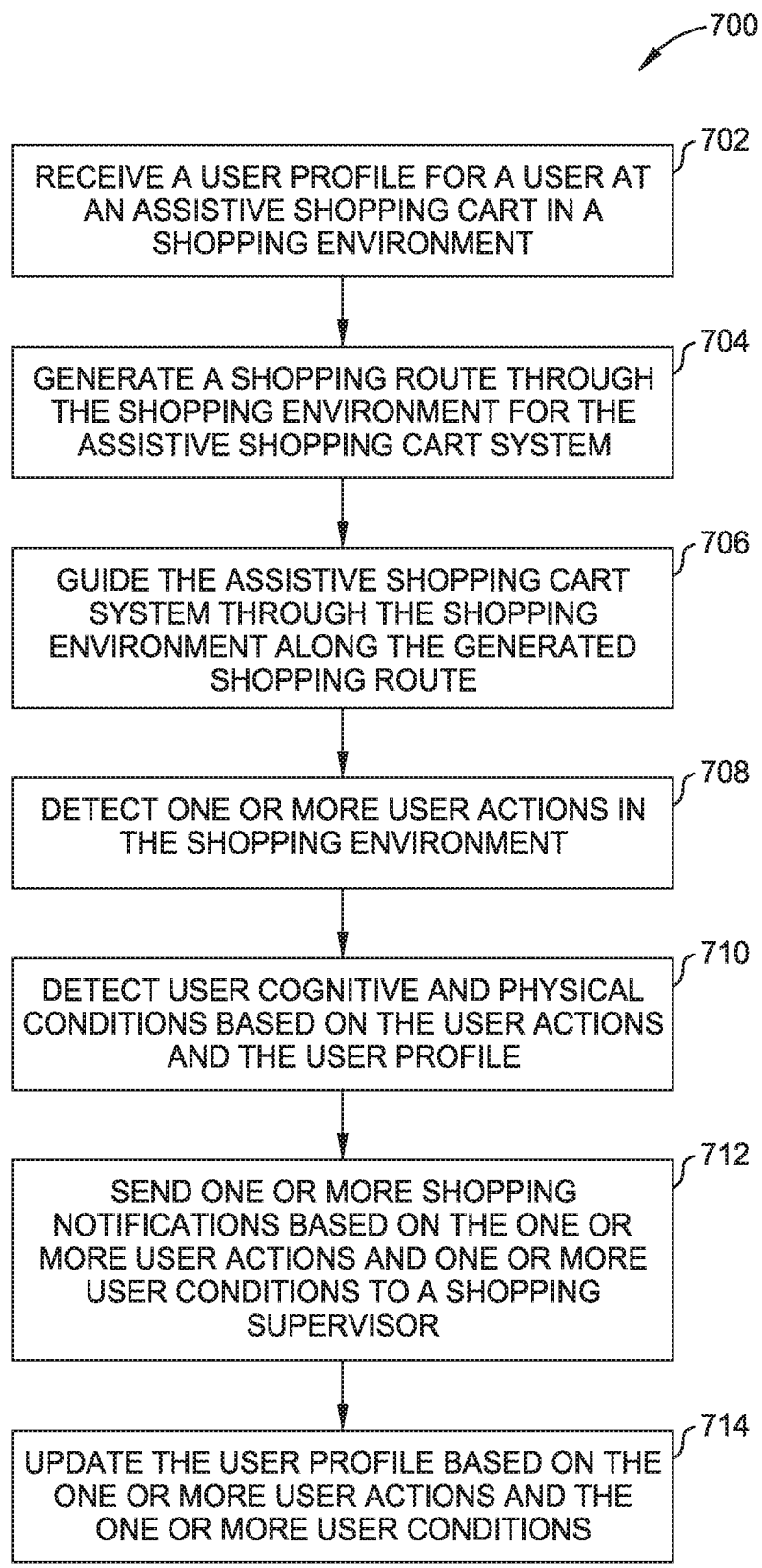
FIG. 7 illustrates a flowchart for an assistive shopping cart system, according to embodiments.

FIG. 7 illustrates a flowchart for an assistive shopping cart system, according to embodiments. In some examples, when the user 101 arrives at the environment 100, the user 101 may enter the environment through the entrance 202 as shown in FIG. 2. In some examples, the user 101 acquires an assistive shopping cart, such as the assistive shopping cart system 110, from the cart storage area 204. In other examples, the assistive shopping cart may be acquired in one or more other areas associated with the environment 100 (e.g., in a parking lot or other cart storages area). In some examples, the user 101 may need assistance in both navigation and physical assistance in the environment 100. In this example, the assistive shopping cart includes both the control system 112 described above to provide navigational support to the user 101 in addition to a motorized system (e.g., motor 120) that drives/propels the assistive shopping cart system 110 through the environment 100.

In some examples, the user 101 also has a form of identification associated with a user profile 621 and the environment 100. For example, the user has a user identification card, card 102, and/or a mobile device 104 that includes the user identification. The user interacts with assistive shopping cart system 110 and the control system 112 to identify themselves to the system. For example, the user may scan the card 102 and/or provide a communication between the mobile device 104 (e.g., wireless communication (RFID, Bluetooth, Wi-Fi, etc.) to identify themselves to the control system 112. In some examples, the control system 112 queries a user profile database associated with the environment 100 and the control system 112 (e.g., user profile 621 stored in the server 550).

Method 700 begins at block 702, where the user information module 614 receives a user profile and a shopping list for a user at an assistive shopping cart in a shopping environment. For example, in response to the query for the user 101's user profile, the control system 112 receives the user profile 621 associated with the user 101. In some examples, the user profile includes identifying information for the user 101 along with other information such as data related to previous shopping trips/experiences (e.g., time spent shopping, items purchases, etc.). Additionally, the user profile may include a shopping list generated by the user or person associated with the user (e.g., a caretaker, spouse, etc.) and/or a shopping list generated based on previous shopping trips. In some examples, the shopping list may also be received independent of the user profile, such as received from another application on the user device, etc. In some examples, such as when the user does not need navigational or other assistance in the environment 100, the assistive shopping cart system 110 only displays, through a user interface 400, information associated with the user profile including an identification of the user and the shopping list. In another example, such as when the user profile 621 indicates that the user may need assistance or the user requests assistance the assistive shopping cart system 110 and the control system 112 proceeds to offer assistance to the user 101.

Figure 8:
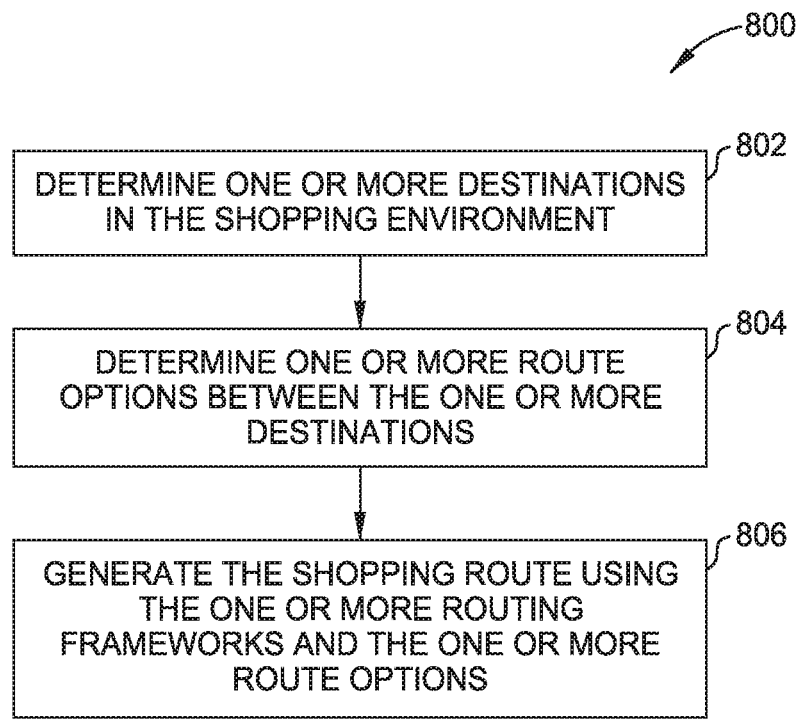
FIG. 8 illustrates a flowchart for shopping route generation, according to embodiments

At block 704, the control system 112 generates, based on the user profile and a shopping environment layout, a shopping route through the shopping environment for the assistive shopping cart system 110. For example, as described in relation to FIGS. 2, 3A-3C, the control system 112 generates a shopping route (e.g., shopping route 350) based on the user 101's user profile and the layout 200. In some examples, the route generation process includes the processes described in relation to FIG. 8. For example, at block 802 of method 800, the control system 112 determines, from the user profile, one or more destinations in the shopping environment. For example, the control system 112 identifies items from the shopping list associated with the user profile and adds the locations of the items as destinations. In another example, the control system 112 determines from the stored user profile 621 one or more locations the user 101 typically frequents during shopping trips. For example, the user 101 typically may visit a magazine section or an in-store coffee bar of the environment 100, the control system 112 determines that the location should be visited as a destination. Once the control system 112 determines/identifies the destinations in the shopping environment the control system 112 proceeds to generating the shopping route.

At block 804, the control system 112 determines, using one or more routing frameworks, one or more route options between the one or more destinations. In some examples, the control system 112 uses the routing information/frameworks 623 in conjunction with the user profile received at the control system 112 to generate/determine the route options. In some examples, the routing frameworks include minimizing one or more routing distances. For example, if the user profile indicates that user 101 cannot travel long distances and/or requires a shorter shopping trip, the control system 112 generates route options between the destinations that minimizes the distance traveled. For example, route option 313 in FIG. 3A illustrates a direct route option from destination 307 to destination 306. In another example, the routing framework includes increasing one or more routing distances. For example, when the user 101, as indicated by the user profile 621, desires to spend more time in the shopping trip (e.g., desires extra walking steps), the control system 112 generates route options such as route option 371 which provides a more round about travel route. Once the route options are generated by the control system 112, the system proceeds to generate the shopping route using the route options.

At block 806, the control system 112 generates the shopping route using the one or more routing frameworks and the one or more route options. For example, the control system 112 using a routing framework which prioritizes one or more destinations in the shopping environment generates the shopping route 360 from the route options 321, 316, and then proceeds to the checkout area to end the shopping trip. In some examples, the destinations are prioritized based on a need for the item at the destination listed in the user profile. In some examples, the control system also incorporates user monitoring conditions in the generation of the shopping route. For example, if the user condition indicates the user is fatigued or not likely to complete a full shopping trip, the shopping route is generated to visit high priority destinations before lower priority destinations.

Returning back to FIG. 7, method 700 continues at block 706, where the control system 112 guides, via a navigation module 612 of the assistive shopping cart system, the assistive shopping cart system 110 through the shopping environment along the generated shopping route. In some examples, the control system guides the user and the assistive shopping cart system 110 by providing directions to the user 101 through one or more visual representations as described in relation to FIG. 9. In some examples, the assistive shopping cart system 110 may also provide propulsion through a motorized system such as cart motor 120. In some examples, the navigation module 612 and cart motor 120 provide both propulsion and routing direction such that the assistive shopping cart system 110 is moved through the environment 100 without the user 101 needing to provide navigation and/or propulsion to the assistive shopping cart system 110. Further, due to the dynamic nature of the shopping trip there may be instances when the user 101 and/or other factors in the environment 100 initiate a change in the shopping trip as described in relation FIG. 10.

At block 708, the control system 112 detects one or more user actions in the shopping environment. In some examples, the control system 112 communicates with the sensors 118, the user interface 400, and/or the mobile device 104 to detect the user actions in the environment 100. In some examples the user actions include an addition of an item to the assistive shopping cart. In this example, the experience module 613 may also update the transaction record 624 with an indication that the item is in the cart for purchase, thus facilitating later checkout at the end of the shopping trip.

User actions may also include a removal of an item from the assistive shopping cart. As before, the experience module 613 may also remove the item from the transaction record 624. The detection of user actions may also be used in conjunction with the user profile and other sensors to determine a user's cognitive and physical conditions.

At block 710, the user information module 614, detects user cognitive and physical conditions based on the user actions and the user profile. In some examples, detecting the user conditions includes detecting an anomalous user movement, such as stumble, prolonged pause, drifting gaze, etc. which may indicate fatigue and/or confusion. Additionally, detecting the user conditions may include detecting a shopping route deviation if the user starts drifting from the guided route, detecting a flagged item in the assistive shopping cart system (e.g., an item that should not be purchase by the user as defined in the user profile), detecting a slowing shopping rate if the user is beginning to tire, and detecting one or more user biometric conditions exceeding a shopping activity threshold. For example, the sensors 118 may detect that the user has an elevated heart rate indicating stress and/or confusion. In some examples, the detected user actions and conditions may indicate that the user is experiencing trouble and may need assistance and/or to shorten the shopping trip, generating a shopping exception as described in relation to FIG. 10. In these cases, a caregiver and/or the user should be notified that the shopping trip is causing certain physical and cognitive conditions.

At block 712, the user information module 614 sends one or more shopping notifications based on the one or more user actions and one or more user conditions to a shopping supervisor. In some examples, such as when the user does not require a caregiver, the shopping supervisor is the user. In this example, the shopping notifications are displayed to the user 101 via the user interface 400 and include notifications such as an indication of items added to assistive shopping cart system 110, items removed from the assistive shopping cart system 110, distance traveled by the user during the shopping trip, any shopping route exceptions, and the detected user conditions etc. In some examples, the shopping supervisor is a person such as a caregiver or family member. In this example, the shopping notifications are such as a caretaker such that the caretaker may remotely monitor the user 101's shopping trip.

For example, the control system 112 may provide an alert to the shopping supervisor (e.g. the caregiver or family member) if any of the following seem anomalous: items placed in cart, items removed from cart, or rate of addition of addition or removal from cart. For example, an item may be anomalous due to its size, contents (e.g. full of sugar for a diabetic or very spicy), and deviation from an established pattern. In some examples, the control system 112 using the user profile 621 learns a user's buying patterns or preferences through time, or learn the patterns of a cohort of users with certain conditions. In some cases, the third-party may be able to provide feedback to the user through the user interface 400, e.g. "Dad, you don't want that hot sauce; it is too spicy for you." In some examples, the rules/thresholds for notifying the third party (e.g., caregiver) are based on rules defined by the caregiver and stored in the user profile 621.

At block 714, the user information module 614 updates the user profile based on the one or more user actions and one or more user conditions. For example, the user profile 621 is updated to include an indication of items purchased, shopping route traversed, and any detected user actions. This information can then be used by the control system 112 in future shopping trips and further analysis by the user 101 and a caretaker of the user. For example, the user 101 may review their shopping trip including items purchases and the shopping route/steps traversed. Additionally, the items purchased and other information stored in the user profile may be used by the control system 112 in future shopping route generation and shopping trip planning.

FIG. 9 illustrates a flowchart for visually guiding a user through a shopping environment, according to embodiments. As described in relation to block 706 in FIG. 7, a user is guided through the shopping environment 100. In some examples, the shopping trip also includes user interaction with visual representations of the environment and the assistive shopping cart system 110. For example, method 900 begins at block 902, where the control system 112 displays, via a user interface, a visual representation of the shopping route with one or more shopping route details. In some examples, the user interface includes one or more devices attached to the assistive shopping cart system 110. For example, the assistive shopping cart system 110 may include a touch screen or other device that includes a display and input/out components (e.g., user interface 641). In another example, the control system 112 may interact with the user mobile device, mobile device 104, using the user interface components of the user device to display the visual representation of the shopping route with one or more shopping route details. In some examples, the user interface includes the user interface 400, described in relation to FIG. 4, and includes various information that is obtained and displayed by the control system 112. Including the visual representation of the shopping route in layout including 402.

At block 904, the control system 112 displays a next destination in the shopping route with one or more destination details. For example, as described in relation to FIG. 4, the control system causes the user interface to display the next destination 414 including the destination details along with the next destination 406 in the layout 402. As the user traverses and/or is routed through the environment 100, the visual representation and the user interface are updated with information representing the user 101's current location, destination, next item, etc.

In some examples, the visual representation and audio associated with the user interface 400 may change based on cognitive considerations such as any of: a user profile specifying a user with special needs, a real-time monitoring of the user (e.g., is the user pausing or looking at the floor, indicating confusion), etc. For example, if the user seems confused or distracted, or is prone to confusion, the image of the product may be magnified, and a voice may remind the user what he or she is seeking. The user specific profile can also be activated by connecting the cart to the mobile device 104, and an application for the cart and environment 100 can communicate settings, data, shopping list etc. to the control system 112.

In some examples, the control system 112 generates and displays and/or audibly broadcasts a natural language explanation of the next destination 414. In some examples the natural language description/explanation is generated based on one or more properties and/or conditions stored in the user profile and described above. For example, for a user 101 that has cognitive decline as indicated in the user profile, the next destination may include details in addition to the destination including a time to the destination. In some examples, the next destination 414 includes details on the route choices including details on an indirect route (to avoid a crowded aisle, hazard, etc.) and includes calming language such as "don't worry," etc. In some examples, the user 101 interacts with the cart system 110 to request an explanation of the next destination 414 and the natural language description is display and audibly broadcast to the user.

Figure 10:
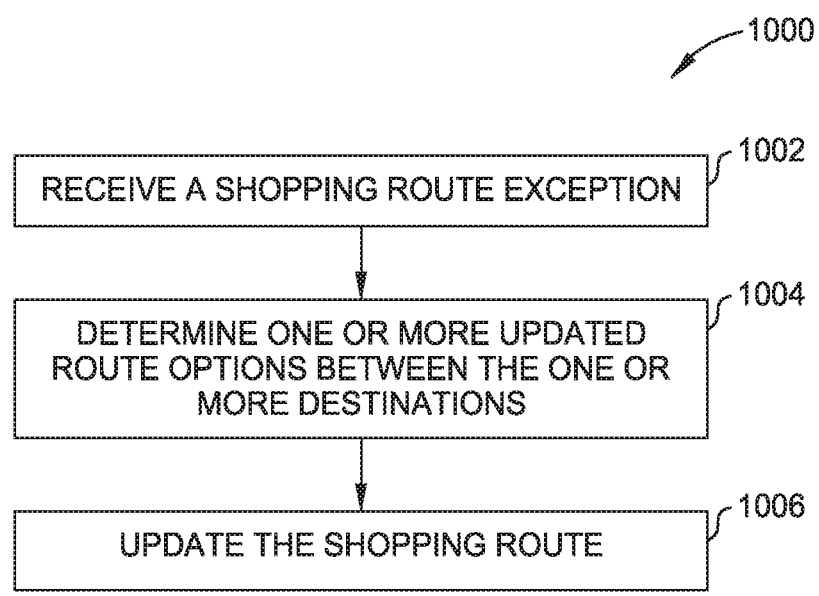
FIG. 10 illustrates a flowchart for a shopping route exception, according to embodiments

FIG. 10 illustrates a flowchart for a shopping route exception, according to embodiments. In some examples, during a shopping trip described in relation to FIG. 7, a shopping route exception may be received at the assistive shopping cart. The method 1000 begins at block 1001, receiving a shopping route exception at the control system 112. In one example, the shopping route exception includes an input from the user 101, such as receiving an input from the user interaction area 420. For example, when the user 101 is feeling fatigued the user 101 can select the pause input button 422 and/or the end input button 424. In another example, the shopping exception includes one or more exceptions detected by the control system 112. For example, the control system 112 using the sensors 118 may detect that the user is acting abnormally or outside certain thresholds as described in relation to block 710. For example, if the sensors 118 detect that a user is adding items to the receptacle of the shopping cart 114 at an unusual rate and/or adding unneeded items to the receptacle of the shopping cart 114, the experience module 613 generates a shopping exception.

At block 1002, the navigation module 612, in response to the receiving the shopping route exception, determines, using the one or more routing frameworks and based on the shopping router exception, one or more updated route options between the one or more destinations. For example, if the user selects to end the shopping trip via the user interface 400, the navigation module begins a checkout/exit process and generates route options directed towards the checkout area 212 and entrance 202. In another example, if the experience module has generated a shopping route exception based on data from the sensors 118, the navigation module generates one or more updated route options based on the sensor data.

At block 1003, the navigation module 612 updates the shopping route using the one or more routing frameworks and the one or more updated route options. For example, the navigation module 612 may shorten the shopping route 350 shown in FIG. 3B at destination 303 and by using an updated route option to navigate towards the checkout area 212 to shorten the shopping trip.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., control system 112) or related data available in the cloud. For example, the control system 112 could execute on a computing system in the cloud and conduct the shopping trip for the user of the assistive shopping cart system. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a user profile and a shopping list for a user at an assistive shopping cart system in a shopping environment;
   generating, based on the user profile, the shopping list, and a shopping environment layout, a shopping route for guiding and propelling the assistive shopping cart system through the shopping environment;
   guiding, via a navigation module of the assistive shopping cart system and a system motor, the assistive shopping cart system through the shopping environment along the generated shopping route, wherein assistive shopping cart system provides, via the system motor, self-propulsion and self-routing direction along the generated shopping route;
   detecting one or more user actions in the shopping environment;
   detecting adverse user cognitive and physical conditions based on the one or more user actions, the user profile, and detected biometric conditions comprising at least a user breathing rate and a user pulse, wherein the adverse user cognitive and physical conditions indicate the user is experiencing at least one of fatigue, confusion, or stress;
   generating, based on the adverse user cognitive and physical conditions and the user profile, a natural language description of the shopping route and a next destination;
   providing the natural language description to the user via at least one of displaying the natural language description as a text and audibly broadcasting the natural language description to the user;
   sending one or more shopping notifications based on the one or more user actions and the adverse user cognitive and physical conditions to a shopping supervisor; and
   updating the user profile based on the one or more user actions and the adverse user cognitive and physical conditions.

2. The method of claim 1, wherein generating the shopping route comprises:
   determining, from the user profile and the shopping list, one or more destinations in the shopping environment;
   determining, using one or more routing frameworks, one or more route options between the one or more destinations; and
   generating the shopping route using the one or more routing frameworks and the one or more route options.

3. The method of claim 2, wherein the one or more routing frameworks comprise one or more of:
   minimizing one or more routing distances;
   prioritizing one or more destinations in the shopping environment;
   maximizing one or more routing distances; and
   user monitoring conditions.

4. The method of claim 2, wherein the method further comprises:
   receiving a shopping route exception;
   determining, using the one or more routing frameworks and based on the shopping route exception, one or more updated route options between the one or more destinations; and
   updating the shopping route using the one or more routing frameworks and the one or more updated route options.

5. The method of claim 1, wherein the assistive shopping cart system is associated with a user interface, wherein the method further comprises:
   displaying, via the user interface, a visual representation of the shopping route with one or more shopping route details; and
   displaying the next destination in the shopping route with one or more destination details, wherein the destination details comprise the natural language description of the shopping route and the next destination.

6. The method of claim 1, wherein detecting the one or more user actions in the shopping environment comprises one or more of:
   detecting an addition of an item to the assistive shopping cart system;
   detecting a removal of an item from the assistive shopping cart system; and
   detecting a shopping rate.

7. The method of claim 1, wherein detecting the adverse user cognitive and physical conditions based on the one or more user actions and the user profile comprises:
   detecting an anomalous user movement;
   detecting a shopping route deviation;
   detecting a flagged item in the assistive shopping cart system;
   detecting a slowing shopping rate; and
   detecting biometric conditions outside of a shopping activity threshold.

8. The method of claim 1, wherein updating the user profile based on the one or more user actions and the adverse user cognitive and physical conditions comprises:
   updating the user profile with an indication of one or more of:
      items purchased,
      shopping route traversed,
      the one or more user actions; and
      the adverse user cognitive and physical conditions.

9. A system comprising:
   one or more computer processors; and a memory containing a program which when executed by the one or more computer processors performs an operation comprising:

receiving a user profile and a shopping list for a user at an assistive shopping cart system in a shopping environment;

generating, based on the user profile, the shopping list, and a shopping environment layout, a shopping route for guiding and propelling the assistive shopping cart system through the shopping environment;

guiding, via a navigation module of the assistive shopping cart system and a system motor, the assistive shopping cart system through the shopping environment along the generated shopping route, wherein assistive shopping cart system, via the system motor, provides self-propulsion and self-routing direction along the generated shopping route;

detecting one or more user actions in the shopping environment;

detecting adverse user cognitive and physical conditions based on the one or more user actions, the user profile, and detected biometric conditions comprising at least a user breathing rate and a user pulse, wherein the adverse user cognitive and physical conditions indicate the user is experiencing at least one of fatigue, confusion, or stress;

generating, based on the adverse user cognitive and physical conditions and the user profile, a natural language description of the shopping route and a next destination;

providing the natural language description to the user via at least one of displaying the natural language description as a text and audibly broadcasting the natural language description to the user;

sending one or more shopping notifications based on the one or more user actions and the adverse user cognitive and physical conditions to a shopping supervisor; and updating the user profile based on the one or more user actions and the adverse user cognitive and physical conditions.

10. The system of claim 9, wherein generating the shopping route comprises:

determining, from the user profile and the shopping list, one or more destinations in the shopping environment;

determining, using one or more routing frameworks, one or more route options between the one or more destinations; and generating the shopping route using the one or more routing frameworks and the one or more route options.

11. The system of claim 10, wherein the one or more routing frameworks comprise one or more of:

minimizing one or more routing distances;

prioritizing one or more destinations in the shopping environment;

maximizing one or more routing distances; and user monitoring conditions.

12. The system of claim 10, wherein the operation further comprises:

receiving a shopping route exception;

determining, using the one or more routing frameworks and based on the shopping route exception, one or more updated route options between the one or more destinations; and updating the shopping route using the one or more routing frameworks and the one or more updated route options.

13. The system of claim 9, wherein the assistive shopping cart system is associated with a user interface, wherein the operation further comprises:

displaying, via the user interface, a visual representation of the shopping route with one or more shopping route details; and displaying the next destination in the shopping route with one or more destination details, wherein the destination details comprise the natural language description of shopping route and the next destination.

14. The system of claim 9, wherein detecting the one or more user actions in the shopping environment comprises one or more of:

detecting an addition of an item to the assistive shopping cart system;

detecting a removal of an item from the assistive shopping cart system; and detecting a shopping rate.

15. The system of claim 9, wherein detecting the adverse user cognitive and physical conditions based on the one or more user actions and the user profile comprises:

detecting an anomalous user movement;

detecting a shopping route deviation;

detecting a flagged item in the assistive shopping cart system;

detecting a slowing shopping rate; and detecting one or more user biometric conditions exceeding a shopping activity threshold.

16. The system of claim 9, wherein updating the user profile based on the one or more user actions and the adverse user cognitive and physical conditions comprises:

updating the user profile with an indication of one or more of:

items purchased, shopping route traversed, the one or more user actions; and the adverse user cognitive and physical conditions.

17. A computer program product, the computer program product comprising:

a computer-readable storage medium having computer-readable program code embodied therewith, the computer-readable program code executable by one or more computer processors to perform an operation, the operation comprising:

receiving a user profile and a shopping list for a user at an assistive shopping cart system in a shopping environment;

generating, based on the user profile, the shopping list, and a shopping environment layout, a shopping route for guiding and propelling the assistive shopping cart system through the shopping environment;

guiding, via a navigation module of the assistive shopping cart system and a system motor, the assistive shopping cart system through the shopping environment along the generated shopping route, wherein assistive shopping cart system provides, via the system motor, self-propulsion and self-routing direction along the generated shopping route;

detecting one or more user actions in the shopping environment;

detecting adverse user cognitive and physical conditions based on the one or more user actions, the user profile, and detected biometric conditions comprising at least a user breathing rate and a user pulse, wherein the adverse user cognitive and physical conditions indicate the user is experiencing at least one of fatigue, confusion, or stress;

generating, based on the adverse user cognitive and physical conditions and the user profile, a natural language description of the shopping route and a next destination;

providing the natural language description to the user via at least one of displaying the natural language description as a text and audibly broadcasting the natural language description to the user;

sending one or more shopping notifications based on the one or more user actions and the adverse user cognitive and physical conditions to a shopping supervisor; and updating the user profile based on the one or more user actions and the adverse user cognitive and physical conditions.

18. The computer program product of claim 17, wherein generating the shopping route comprises:
    determining, from the user profile and the shopping list, one or more destinations in the shopping environment;
    determining, using one or more routing frameworks, one or more route options between the one or more destinations; and
    generating the shopping route using the one or more routing frameworks and the one or more route options.

19. The computer program product of claim 17, wherein detecting the one or more user actions in the shopping environment comprises one or more of:
    detecting an addition of an item to the assistive shopping cart system;
    detecting a removal of an item from the assistive shopping cart system;
    detecting a shopping rate;
    detecting an anomalous user movement; and
    detecting a shopping route deviation.

20. The computer program product of claim 17, wherein detecting the adverse user cognitive and physical conditions based on the one or more user actions and the user profile comprises:
    detecting an anomalous user movement;
    detecting a shopping route deviation;
    detecting a flagged item in the assistive shopping cart system;
    detecting a slowing shopping rate; and
    detecting one or more user biometric conditions exceeding a shopping activity threshold.

\* \* \* \* \*